United States Patent
Liu et al.

(10) Patent No.: US 12,250,736 B2
(45) Date of Patent: Mar. 11, 2025

(54) COMMUNICATION METHOD AND SYSTEM, BASE STATION AND TERMINAL

(71) Applicant: CHINA TELECOM CORPORATION LIMITED, Beijing (CN)

(72) Inventors: Shengnan Liu, Beijing (CN); Zheng Jiang, Beijing (CN); Peng Chen, Beijing (CN); Xiaoming She, Beijing (CN)

(73) Assignee: CHINA TELECOM CORPORATION LIMITED, Beijing (CN)

(*) Notice: Subject to any disclaimer, the term of this patent is extended or adjusted under 35 U.S.C. 154(b) by 369 days.

(21) Appl. No.: 17/772,804

(22) PCT Filed: Jul. 13, 2020

(86) PCT No.: PCT/CN2020/101565
§ 371 (c)(1),
(2) Date: Apr. 28, 2022

(87) PCT Pub. No.: WO2021/082527
PCT Pub. Date: May 6, 2021

(65) Prior Publication Data
US 2022/0361068 A1   Nov. 10, 2022

(30) Foreign Application Priority Data
Oct. 30, 2019  (CN) .................. 201911042164.X

(51) Int. Cl.
  *H04W 36/00*  (2009.01)
  *H04W 76/10*  (2018.01)
  *H04W 36/14*  (2009.01)

(52) U.S. Cl.
  CPC ....... *H04W 76/10* (2018.02); *H04W 36/0058* (2018.08); *H04W 36/0061* (2013.01); *H04W 36/00838* (2023.05); *H04W 36/14* (2013.01)

(58) Field of Classification Search
  CPC ......... H04W 36/0058; H04W 36/0061; H04W 76/10; H04W 36/00838; H04W 36/14;
  (Continued)

(56) References Cited

U.S. PATENT DOCUMENTS

2010/0215026 A1* 8/2010 Cheng ................ H04W 36/385 370/338
2021/0105712 A1* 4/2021 Speicher .............. H04W 48/08

FOREIGN PATENT DOCUMENTS

CN 110213808 A 9/2019

OTHER PUBLICATIONS

CMCC Left issues in idle and inactive mode for NPN (Year: 2019).*
(Continued)

*Primary Examiner* — Abdullahi E Salad
(74) *Attorney, Agent, or Firm* — Andrew M. Calderon; Calderon Safran & Wright P.C.

(57) ABSTRACT

The present disclosure relates to a communication method, system, base station, and terminal. The method includes: sending, by a first BS, a broadcast message, which comprises: a NID and a PLMN ID, which correspond to each of one or more SNPNs supported by the first BS; receiving, by the first BS, a connection request sent from a terminal, wherein the connection request represents that the first BS supports at least one of one or more SNPNs subscribed by the terminal; establishing, by the first BS, a RRC connection with the terminal; receiving, by the first BS, a RRC connection setup complete message sent from the terminal, wherein the RRC connection setup complete message carries a NID and a PLMN ID, which correspond to a SNPN that the terminal selects to access; and connecting, by the first BS, the terminal to the SNPN that the terminal selects to access.

19 Claims, 5 Drawing Sheets

(58) Field of Classification Search
CPC ..... H04W 8/186; H04W 48/12; H04W 12/06; H04W 12/08; H04W 48/18; H04W 48/10; H04W 36/0085; H04W 76/11
See application file for complete search history.

(56) References Cited

OTHER PUBLICATIONS

Supplementary European Search Report issued on Oct. 31, 2022 in related European Patent Application No. 20883430.9; 12 pages.
CMCC: "Left issues in idle and inactive mode for NPN", 3GPP Draft; R2-1912924 Left Issues in Idle and Inactive Mode for NPN, 3rd Generation Partnership Project (3GPP), Mobile Competence Centre; 650, Route Des Lucioles; F-06921 Sophia-Antipolis Cedex; Oct. 2019; 9 pages.
Huawei: "RAN impact analysis of NPN", 3GPP Draft; R3-190888, 3rd Generation Partnership Project (3GPP), Mobile Competence Centre; 650, Route Des Lucioles; F-06921 Sophia-Antipolis Cedex; France; vol. RAN WG3, No. Athens, Greece; Feb. 25-Mar. 1, 2018; Feb.-Mar. 2018; 3 pages.
Ericsson: Overview of Stand-alone NPN 1-15 (SNPN) II, 3GPP Draft; R2-1908977—Overview of SNPN, 3rd Generation Partnership Project (3GPP), Mobile Competence Centre; 650, Route Des Lucioles; F-06921 Sophia-Antipolis Cedex; France; vol. RAN WG2, No. Prague, Czech Republic; Aug. 26-Aug. 30, 2019 Aug. 15, 2019; 10 pages.
International Preliminary Report issue on May 3, 2022 and Written Opinion issued in corresponding Application No. PCT/CN2020/101565 mailed on Aug. 31, 2020, 12 pages.
Samsung. NW selection considering RAN sharing for NPNs SA WG2 Meeting #132 S2-1903572, Apr. 12, 2019 (Apr. 12, 2019), unit 5.18.
Samsung et al. NW selection considering RAN sharing for SNPNs SA WG2 Meeting #133 S2-1905436, May 17, 2019 (May 17, 2019), unit 5.18.
Qualcomm Inc. Network sharing aspects for SNPNs SA WG2 Meeting #133 S2-1904993, May 17, 2019 (May 17, 2019), unit 5.18.
Chinese Office Action in CN Application No. 201911042164.X dated Mar. 8, 2022, 62 pages.
Notice of Reasons for Refusal issued Apr. 22, 2024 in JP Application No. 2022-525747 with English Translation, 11 Pages.
Unknown, "Consideration on standalone NPN", 3GPP TSG-RAN WG2 #107, Prague, Czech Republic, Aug. 26-30, 2019, 10 pages.
Unknown, "General support of public network integrated NPN", 3GPP TSG-RAN3 Meeting #105, Ljubljana, Slovenia, Aug. 26-30, 2019, with English Translation, 8 pages.
Unknown, "General support of standalone NPN in RAN", 3GPP TSG-RAN3 Meeting #105, Ljubljana, Slovenia, Aug. 26-30, 2019, with English Translation, 7 pages.

\* cited by examiner

COMMUNICATION METHOD AND SYSTEM, BASE STATION AND TERMINAL

CROSS-REFERENCE TO RELATED APPLICATIONS

The present disclosure is a U.S. National Stage Application under 35 U.S.C. § 371 of International Patent Application No. PCT/CN2020/101565, filed on Jul. 13, 2020, which is based on and claims priority of Chinese application for invention No. 201911042164.X filed on Oct. 30, 2019, the disclosures of both of which are hereby incorporated into this disclosure by reference in its entirety.

TECHNICAL FIELD

The present disclosure relates to the field of communication technology, and in particular, to a communication method and system, a base station, and a terminal.

BACKGROUND

The research goal of 5G technology is to provide communication with higher reliability and lower delay, so as to meet requirements of different users in different industries. For example, according to requirements of users in vertical industries and local area networks (LAN), non-public networks dedicated to some specific users can be designed for providing communication services. Standalone non-public networks can meet the requirements of users in vertical industries and specific LANs.

At present, a research point of considering that the 5G network will support Standalone Non-Public Network (SNPN) function in the future has been found in the research of NR (New Radio) high-level core network technology. However, there is no solution for SNPN proposed in the current research of wireless side technology. In order to support the SNPN function in the 5G stage, it is necessary to design a corresponding system process.

SUMMARY

According to some embodiments of the present disclosure, a communication method is provided, comprising: sending, by a first Base Station (BS), a broadcast message, which comprises: a Network Identifier (NID) and a Public Land Mobile Network Identifier (PLMN ID), which correspond to each of one or more Standalone Non-Public Networks (SNPNs) supported by the first BS; receiving, by the first BS, a connection request sent from a terminal, wherein the connection request represents that the first BS supports at least one of one or more SNPNs subscribed by the terminal; establishing, by the first BS, a Radio Resource Control (RRC) connection with the terminal according to the connection request; receiving, by the first BS, a RRC connection setup complete message sent from the terminal, wherein the RRC connection setup complete message carries a NID and a PLMN ID, which correspond to a SNPN that the terminal selects to access; and connecting, by the first BS, the terminal to the SNPN that the terminal selects to access, according to the RRC connection setup complete message.

In some embodiments, connecting, by the first BS, the terminal to the SNPN that the terminal selects to access comprises: sending, by the first BS, an initial user equipment (UE) message to a core network element, wherein the initial UE message comprises the NID and the PLMN ID, which correspond to the SNPN that the terminal selects to access, which are used for verifying whether a current access of the terminal is legal; and receiving, by the first BS, a downlink non-access stratum transport message sent from the core network element, and connecting the terminal to the SNPN that the terminal selects to access according to the downlink non-access stratum transport message, wherein the downlink non-access stratum transport message represents that the current access of the terminal is legal.

In some embodiments, the NID corresponding to the SNPN that the terminal selects to access is added to a mobility restriction list of the downlink non-access stratum transport message as a serving NID; or whether the current access of the terminal is legal is determined according to a comparison result between the NID and the PLMN ID, which correspond the SNPN that the terminal selects to access and NIDs and PLMN IDs, which correspond to the one or more SNPNs subscribed by the terminal.

In some embodiments, the method further comprises: receiving, by the first BS, a measurement report sent from the terminal, wherein the measurement report comprises: a NID, a PLMN ID and signal quality information of a cell, which correspond to a SNPN that the terminal applies to access; making a handover judgment and determining a cell corresponding to a second BS as a target cell according to the measurement report by the first BS; sending, by the first BS, a handover required message to a core network element, to initiate a handover request to the second BS through the core network element, wherein the handover required message comprises the NID and the PLMN ID, which correspond the SNPN that the terminal applies to access, and an identifier of the target cell, in a case where the first BS judges that a handover condition is met; and receiving, by the first BS, a handover command returned by the core network element, and executing a handover process, wherein the handover command represents that the target cell supports the SNPN that the terminal applies to access.

In some embodiments, sending, by the first BS, the handover required message to the core network element, to initiate the handover request to the second BS through the core network element comprises: matching, by the first BS, the NID and the PLMN ID, which correspond the SNPN that the terminal applies to access with a NID and a PLMN ID, which correspond to a SNPN to which the terminal is connected under the first BS; if matched, comparing, by the first BS, the NID and the PLMN ID, which correspond to the SNPN to which the terminal is connected under the first BS with a NID and a PLMN ID, which correspond to each core network element, and determining a core network element with a same NID and a same PLMN ID as the NID and the PLMN ID, which correspond to the SNPN to which the terminal is connected under the first BS, and sending the handover required message to the core network element; optionally, the method further comprising: receiving, by the first BS, a configuration update signaling or a Next Generation (NG) setup response message of each core network element, wherein the configuration update signaling comprises information of an updated NID corresponding to the each core network element, or the NG setup response message comprises a NID corresponding to the each core network element.

In some embodiments, after the first BS sends the handover required message to the core network element, determining, by the core network element, whether a current handover of the terminal is legal according to a comparison result between the NID and the PLMN ID, which correspond to the SNPN that the terminal applies to access and NIDs and PLMN IDs, which correspond to one or more SNPNs subscribed by the terminal; and sending, by the core network element, the handover request to the second BS, in a case where the current handover of the terminal is legal.

In some embodiments, sending, by the core network element, the handover request to the second BS comprises: matching the NIDs and the PLMN IDs, which correspond to the one or more SNPNs subscribed by the terminal with NIDs and PLMN IDs, which correspond to one or more SNPNs supported by the second BS, and sending the handover request to the second BS by the core network element, in a case where the match is successful; or matching the NID and the PLMN ID, which correspond to the SNPN that the terminal applies to access with a NID and a PLMN ID, which correspond to a SNPN supported by the target cell, and sending the handover request to the second BS by the core network element, in a case where the match is successful; optionally, wherein the second BS sends the NIDs corresponding to the one or more SNPNs supported by the second BS to the core network element through a Next Generation (NG) setup request or a Radio Access Network (RAN) configuration update message.

In some embodiments, the handover request comprises a mobility restriction list, which comprises the NID and the PLMN ID, which correspond to the SNPN that the terminal applies to access, and the method further comprises: determining, by the second BS, whether to allow a handover of the terminal according to a comparison result between the NID and the PLMN ID, which correspond to the SNPN that the terminal applies to access, and NIDs and PLMN IDs, which correspond to one or more SNPNs supported by the second BS, or a comparison result between the NID and the PLMN ID, which correspond to the SNPN that the terminal applies to access and a NID and a PLMN ID, which correspond to a SNPN supported by the target cell; sending, by the second BS, a handover request acknowledge message to the core network element, in a case of allowing the handover of the terminal; and sending, by the core network element, a handover command to the first BS according to the handover request acknowledge message.

According to other embodiments of the present disclosure, a communication method is provided, comprising: receiving, by a terminal, a broadcast message sent from a first Base Station (BS), wherein the broadcast message comprising: a Network Identifier (NID) and a Public Land Mobile Network Identifier (PLMN ID), which correspond to each of one or more Standalone Non-Public Networks (SNPNs) supported by the first BS; determining, by the terminal, whether the first BS supports at least one of one or more SNPNs subscribed by the terminal according to the broadcast message; if the first BS supports at least one of the one or more SNPNs subscribed by the terminal, selecting, by the terminal, an SNPN from the at least one of the one or more SNPNs subscribed by the terminal and supported by the first BS; sending, by the terminal, a connection request to the first BS, and establishing a Radio Resource Control (RRC) connection with the first BS; and sending, by the terminal, a RRC connection setup complete message to the first BS, wherein the RRC connection setup complete message carries a NID and a PLMN ID, which correspond to the SNPN that the terminal selects, to instruct the first BS to connect the terminal to the SNPN selected.

In some embodiments, determining, by the terminal, whether the first BS supports at least one of the one or more SNPNs subscribed by the terminal according to the broadcast message comprises: determining, by the terminal, whether the first BS supports at least one of the one or more SNPNs subscribed by the terminal according to a comparison result between the NIDs and the PLMN IDs, which correspond to the one or more SNPNs subscribed by the terminal and the NID and the PLMN ID, which correspond to the each of the one or more SNPNs supported by the first BS.

In some embodiments, the method further comprises: sending, by the terminal, a measurement report to the first BS, wherein the measurement report comprises: a NID, a PLMN ID and signal quality information of a cell, which correspond to a SNPN that the terminal applies to access, to instruct the first BS to handover the terminal to the SNPN that the terminal applies to access.

According to still other embodiments of the present disclosure, a BS is provided, wherein the BS is a first BS which comprises: a sending module configured to send a broadcast message, which comprises: a Network Identifier (NID) and a Public Land Mobile Network Identifier (PLMN ID), which correspond to each of one or more Standalone Non-Public Networks (SNPNs) supported by the first BS; a determining module configured to determine whether the first BS supports at least one of one or more SNPNs subscribed by the terminal according to the broadcast message; and a sending module configured to, if the first BS supports at least one of the one or more SNPNs subscribed by the terminal, select an SNPN from the at least one of the one or more SNPNs subscribed by the terminal and supported by the first BS, send a connection request to the first BS, establish a Radio Resource Control (RRC) connection with the first BS, send a RRC connection setup complete message to the first BS, wherein the RRC connection setup complete message carries a NID and a PLMN ID, which correspond to the SNPN that the terminal selects, to instruct the first BS to connect the terminal to the SNPN selected.

According to still other embodiments of the present disclosure, a terminal is provided, comprising: a receiving module configured to receive a broadcast message sent from a first Base Station (BS), wherein the broadcast message comprising: a Network Identifier (NID) and a Public Land Mobile Network Identifier (PLMN ID), which correspond to each of one or more Standalone Non-Public Networks (SNPNs) supported by the first BS; a determining module configured to determine whether the first BS supports at least one of one or more SNPNs subscribed by the terminal according to the broadcast message; and a sending module configured to, if the first BS supports at least one of the one or more SNPNs subscribed by the terminal, select an SNPN from the at least one of the one or more SNPNs subscribed by the terminal and supported by the first BS, send a connection request to the first BS, establish a Radio Resource Control (RRC) connection with the first BS, send a RRC connection setup complete message to the first BS, wherein the RRC connection setup complete message carries a NID and a PLMN ID, which correspond to the SNPN that the terminal selects, to instruct the first BS to connect the terminal to the SNPN selected.

According to still other embodiments of the present disclosure, a communication system is provided, comprising: a BS according to any of the foregoing embodiments and a terminal according to any of the foregoing embodiments.

In some embodiments, further comprising: a core network element configured to receive an initial user equipment (UE) message sent from the first BS, determine whether a current access of the terminal is legal according to the initial UE message, and send a downlink non-access stratum transport message to the first BS, in a case where the current access of the terminal is legal, wherein the initial UE message comprises the NID and the PLMN ID, which correspond to the SNPN that the terminal selects to access; optionally, wherein the system further comprises: a second BS, wherein the core network element is further configured to receive a handover required message sent from the first BS, send a handover request to the second BS according to the handover required message, receive a handover request acknowledge message sent from the second BS, and return a handover command to the first BS, wherein the handover required message comprises the NID and the PLMN ID, which correspond to the SNPN that the terminal applies to access, and an identifier of a target cell; and the second BS is configured to receive the handover request sent from the core network element, if the target cell supports the SNPN that the terminal applies to access, send the handover request acknowledge message to the core network element.

In some embodiments, the core network element is configured to determine whether the current access of the terminal is legal according to a comparison result between the NID and the PLMN ID, which correspond to the SNPN that the terminal selects to access and NIDs and PLMN IDs, which correspond to the one or more SNPNs subscribed by the terminal; or the core network element is configured to send information of an updated NID corresponding to the core network element to the first BS through a core network element configuration update signaling, or send a NID corresponding to the core network element to the first BS through a Next Generation (NG) setup response message.

In some embodiments, the core network element is further configured to determine whether a current handover of the terminal is legal according to a comparison result between the NID and the PLMN ID, which correspond to the SNPN that the terminal applies to access and NIDs and PLMN IDs, which correspond to the SNPNs subscribed by the terminal, and send the handover request to the second BS, in a case where the current handover of the terminal is legal; or the second BS is further configured to determine whether to allow a handover of the terminal according to a comparison result between the NID and the PLMN ID, which correspond to the SNPN that the terminal applies to access, and NIDs and PLMN IDs, which correspond to one or more SNPNs supported by the second BS, or a comparison result between the NID and the PLMN ID, which correspond to the SNPN that the terminal applies to access and a NID and a PLMN ID, which correspond to a SNPN supported by the target cell, and send a handover request acknowledge message to the core network element, in a case of allowing the handover of the terminal.

In one embodiment, the core network element is further configured to match the NIDs and the PLMN IDs, which correspond to the one or more SNPNs subscribed by the terminal with NIDs and PLMN IDs, which correspond to one or more SNPNs supported by the second BS, and send the handover request to the second BS, in a case where the match is successful; or the core network element is further configured to match the NID and the PLMN ID, which correspond to the SNPN that the terminal applies to access with a NID and a PLMN ID, which correspond to a SNPN supported by the target cell, and send the handover request to the second BS, in a case where the match is successful; optionally, the second BS is configured to send the NIDs corresponding to the one or more SNPNs supported by the second BS to the core network element through a Next Generation (NG) setup request or a Radio Access Network (RAN) configuration update message.

According to still other embodiments of the present disclosure, a BS is provided, comprising: a processor; and a memory coupled to the processor and storing instructions that when executed by the processor, cause the processor to execute the methods performed by the first BS and the second BS in the communication method of any one of the foregoing embodiments.

According to still other embodiments of the present disclosure, a terminal is provided, comprising: a processor; and a memory coupled to the processor and storing instructions that when executed by the processor, cause the processor to execute the method performed by the terminal in the communication method of any one of the foregoing embodiments.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

A technical problem to be solved by the present disclosure is to provide a solution for providing SNPN services for a terminal in SA scenario.

In view of the problem that the current standard does not provide a specific solution for how to provide non-public network services for terminals in the 5G SA scenario, this solution is proposed.

In the present disclosure, a new identifier is added on the terminal side. For example, a NID (Network Identifier) is added, which corresponds to each of one or more SNPNs that a terminal registered and authorized to access in a standalone non-public network. The above identifier may be determined when the terminal subscribes and registers, and may be kept by the core network and the terminal, respectively. During an access and a handover process of the terminal, a BS may acquire the above identifier through the core network, which will be described in detail later.

The new identifier is also added on the network side, for example, a NID corresponding to each of one or more SNPNs supported by the BS is added, and a SNPN network can be uniquely determined through a NID and a corresponding PLMN identifier.

Some embodiments of the communication method of the present disclosure will be described below with reference to FIG. 1.

Figure 1:
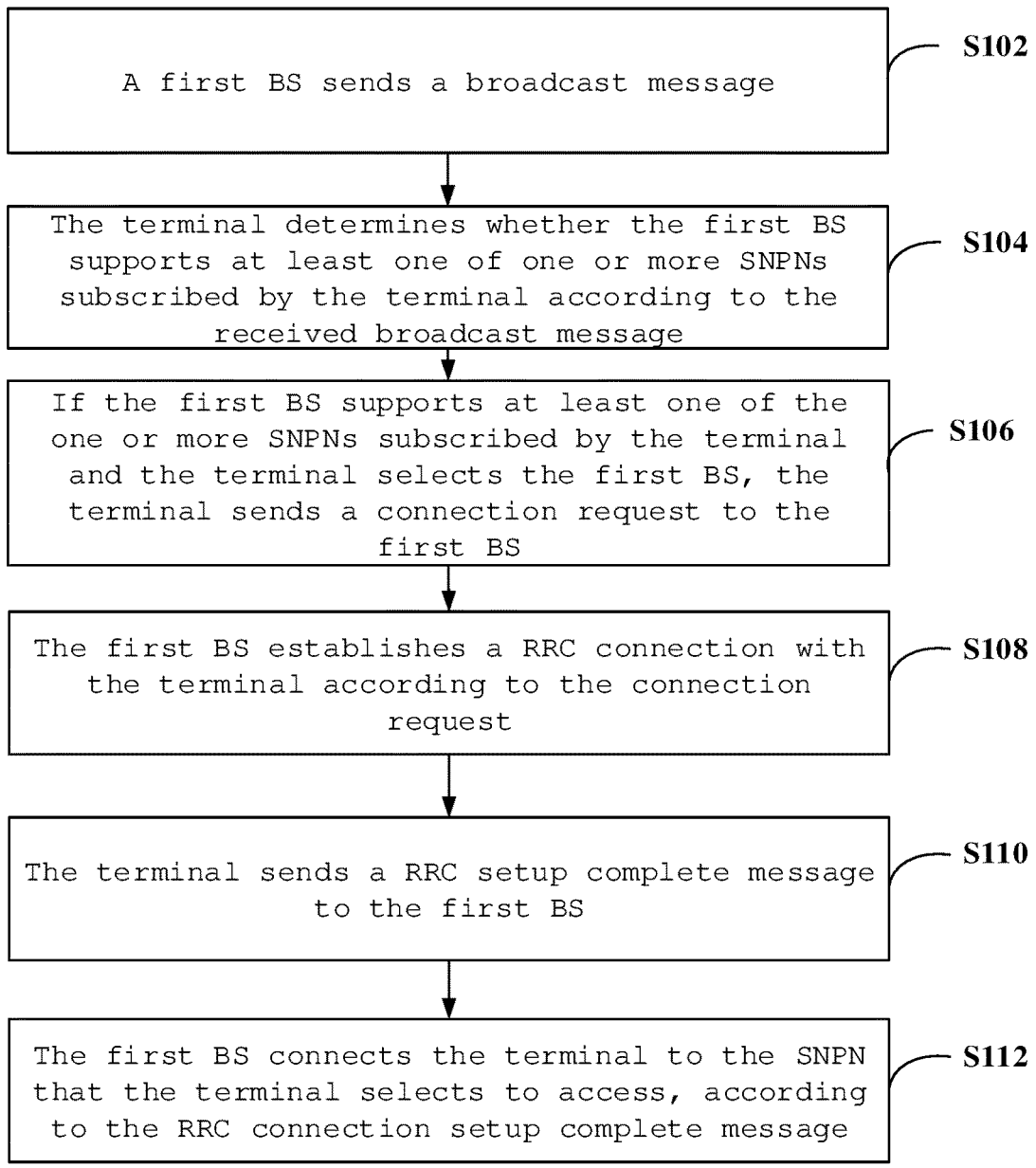
FIG. 1 shows a schematic flowchart of a communication method according to some embodiments of the present disclosure.

FIG. 1 is a flowchart of the communication method according to some embodiments of the present disclosure. As shown in FIG. 1, the method of this embodiment comprises: steps S102 to S112.

In step S102, a first BS sends a broadcast message, and a terminal listens to the broadcast message sent from the first BS correspondingly.

The broadcast message comprises: a NID and a PLMN ID, which correspond to each of one or more SNPNs supported by the first BS. The broadcast message comprises: one or more NIDs supported by the first BS. If there are multiple NIDs, a list of the NIDs can be formed. For example, the NIDs supported by the first BS can be comprised in a SIB (System Information Block), such as in SIB1. The broadcast message may also comprise various information that has been determined in existing standards, for example, a PLMN (Public Land Mobile Network) identifier and the like.

In step S104, the terminal determines whether the first BS supports at least one of one or more SNPNs subscribed by the terminal according to the received broadcast message.

In some embodiments, after receiving the broadcast message, the terminal parses the broadcast message to obtain the NID and the PLMN ID, which correspond to the each of the one or more SNPNs supported by the first BS. The terminal determines whether the first BS supports at least one of the one or more SNPNs subscribed by the terminal according to a comparison result between the NIDs and the PLMN IDs, which correspond to the one or more SNPNs subscribed by the terminal and the NID and the PLMN ID, which correspond to the each of the one or more SNPNs supported by the first BS. If the NIDs and the PLMN IDs, which correspond to the one or more SNPNs supported by the first BS comprise the NIDs and the PLMN IDs, which correspond to at least one of the one or more SNPNs subscribed by the terminal, the first BS supports at least one of the one or more SNPNs subscribed by the terminal; otherwise, the first BS does not support at least one of the one or more SNPNs subscribed by the terminal.

In step S106, if the first BS supports at least one of the one or more SNPNs subscribed by the terminal and the terminal selects the first BS, the terminal sends a connection request to the first BS. Correspondingly, the first BS receives the connection request sent from the terminal.

In addition to the first BS, there may be one or more BSs supporting at least one of the one or more SNPNs subscribed by the terminal, and the above process can be used as an improvement to an existing cell selection or cell reselection process. That is, if the terminal is currently in a cell selection scenario, the first BS or other BS is selected according to a rule in the cell selection process, or if the terminal is currently in a cell reselection scenario, the first BS or other BS is selected according to a rule in the cell reselection process.

The following improvements are made to the existing cell selection and the cell reselection process, and a reference can be made to the existing standards for the unchanged contents. The terminal periodically listens to NIDs and the PLMN IDs of the one or more SNPNs in the broadcast message, and judges whether itself is a terminal that subscribes at least one SNPNs in the one or more SNPNS corresponding to the NIDs and the PLMN IDs in the broadcast message based on the NIDs and the PLMN IDs, which correspond to the subscribed one or more SNPNs. If so, a SNPN corresponding to one of the NIDs and the PLMN IDs in the broadcast message is selected to access according to the cell selection or cell reselection rules.

The terminal sends a connection request such as a RRC Setup Request (Radio Resource Control Setup Request) to the first BS. For this information, a reference may be made to the prior art.

The first BS can connect the terminal to the corresponding SNPN according to the connection request as described below.

In step S108, the first BS establishes a RRC connection with the terminal according to the connection request.

In step S110, the terminal sends a RRC connection setup complete message to the first BS, and the first BS receives the RRC connection setup complete message sent from the terminal. The RRC connection setup complete message may carry a NID and a PLMN ID, which correspond to the SNPN that the terminal selects to access.

In step S112, the first BS connects the terminal to the SNPN that the terminal selects to access, according to the RRC connection setup complete message.

Figure 2:
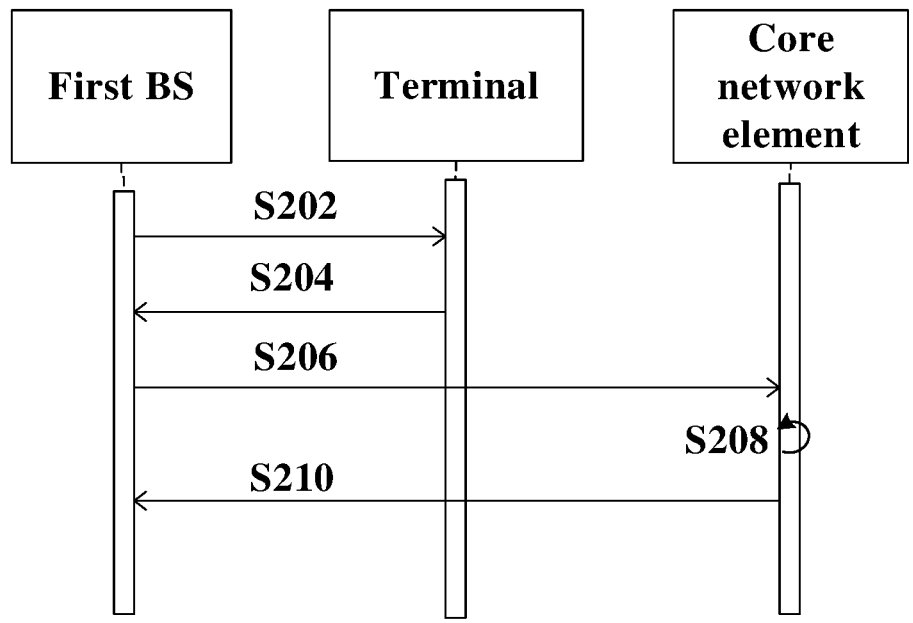
FIG. 2 shows a schematic flowchart of a communication method according to other embodiments of the present disclosure.

In some embodiments, as shown in FIG. 2, a process of the first BS establishing the RRC connection with the terminal, and connecting the terminal to the SNPN that the terminal selects to access comprises: steps S202 to S210.

In step S202, the first BS sends a connection control setup instruction, such as RRC Setup (Radio Resource Control Setup), to the terminal. For this step, a reference can be made to the prior art. For example, the first BS may determine whether to allow the terminal to access according to information such as a load situation; and if allowed, step S204 is performed.

In step S204, the terminal sends a radio resource control setup complete message, for example, the RRC Setup Complete, to the first BS. For this step, a reference may be made to the prior art.

The radio resource control setup complete message may comprise: the NID and the PLMN ID, which correspond to the SNPN that the terminal selects to access. In a case where the first BS supports multiple SNPNs, the terminal will select a SNPN that matches a subscribed SNPN of the terminal to access.

In step S206, the first BS sends an initial user equipment (UE) message to a core network element.

The initial UE message is, for example, INITIAL UE MESSAGE, and comprises: the NID and the PLMN ID, which correspond to the SNPN that the terminal selects to access. In this step, a NID corresponding to the SNPN that the terminal selects to access is added to the existing signaling.

In step S208, the core network element determines whether a current access of the terminal is legal according to the initial UE message.

For example, the core network element is an AMF (Access and Mobility Management Function). In some embodiments, the core network element determines whether the current access of the terminal is legal according to a comparison result between the NID and the PLMN ID of the SNPN that the terminal selects to access and the NIDs and PLMN IDs, which correspond to the one or more SNPNs subscribed by the terminal. If the NID and the PLMN ID, which correspond to the SNPN that the terminal selects to access is within a range of the NIDs and PLMN IDs, which correspond to the one or more SNPNs subscribed by the terminal, the core network element determines that the current access of the terminal is legal; otherwise, the current access is illegal. The core network element authenticates the terminal through the above process.

In step S210, in a case that the current access of the terminal is legal, the core network element sends a downlink non-access stratum transport message to the first BS. Correspondingly, the first BS receives the downlink non-access stratum transport message sent from the core network element.

The downlink non-access stratum transport message is, for example, DOWNLINK NAS TRANSPORT. The NID corresponding to the SNPN that the terminal selects to access can be added to a Mobility Restriction List cell in the DOWNLINK NAS TRANSPORT as a serving NID (Serving NID). For this message, a reference may be made to the prior art. In the above embodiment, in a process of an initial access of the terminal, the NID corresponding to the SNPN that the terminal selects to access is added to the INITIAL UE MESSAGE, and an authentication process of the terminal performed by the core network element is added.

In the method of the above embodiment, the first BS broadcasts the NID and the PLMN ID, which correspond to the each of the one or more SNPNs supported by itself through the broadcast message, and the terminal selects the first BS for initial access according to the one or more SNPNs subscribed by the terminal and the broadcast message listened by the terminal, thereby accessing a corresponding SNPN. The above embodiment provides a solution for the terminal to access a SNPN, so as to realize providing services for the terminal using the non-public network by improving the existing signaling process.

The present disclosure also provides a method for realizing a terminal handover between SNPNs of different BSs. In the SA scenario, the handover is a NG-based (Next Generation) handover, which will be described below with reference to FIG. 3.

A NG-based handover process will be described below with reference to FIG. 3.

Figure 3:
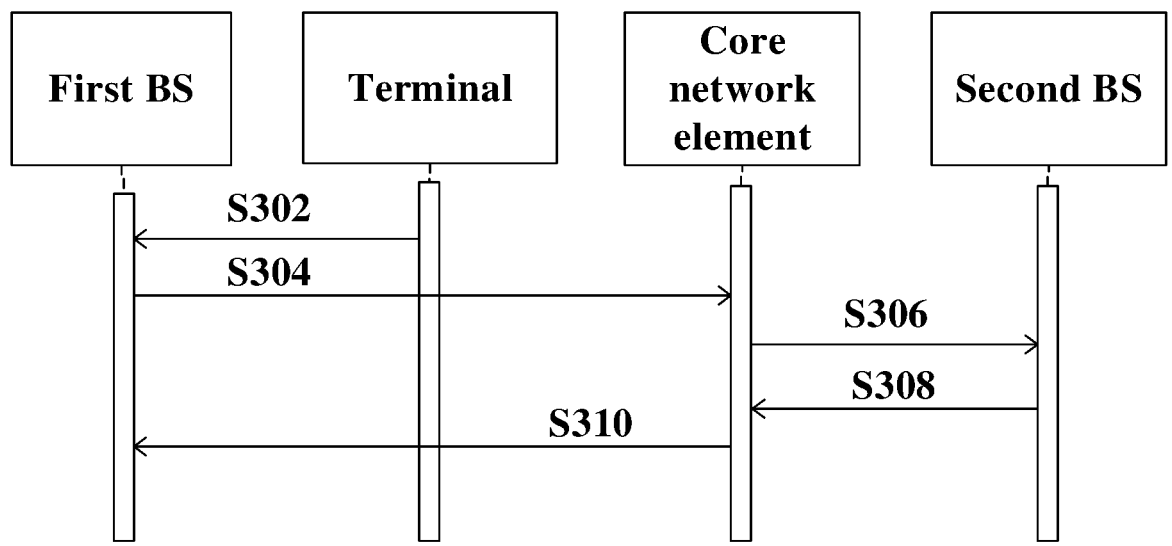
FIG. 3 shows a schematic flowchart of a communication method according to still other embodiments of the present disclosure.

FIG. 3 is a flowchart of a communication method according to still other embodiments of the present disclosure. As shown in FIG. 3, the method of this embodiment comprises: steps S302 to S310.

In step S302, the terminal sends a measurement report to the first BS, and correspondingly, the first BS receives the measurement report sent from the terminal.

The measurement report comprises: a NID, a PLMN ID and signal quality information of a cell corresponding to a SNPN that the terminal applies to access. For other information that may be comprised in the measurement report, a reference can be made to the prior art. In the SA scenario, a handover between different SNPNs is not supported, that is, NIDs and PLMN IDs must be the same for the target BS and the source BS (the first BS). The NID corresponding to the SNPN that the terminal applies to access is added to the measurement report, so that the terminal may be handed over to the same SNPN.

In step S304, the first BS makes a handover judgment and determining a cell corresponding to a second BS as a target cell according to the measurement report by the first BS; and sends a handover required message to the core network element in a case where the first BS judges that a handover condition is met.

The core network element is, for example, an AMF. The handover required message is, for example, Handover Required, and comprises: the NID and the PLMN ID, which correspond to the SNPN that the terminal applies to access, and an identifier of the target cell. For the details of making the handover judgment and determining the cell corresponding to the second BS as the target cell by the first BS, a reference can be made to the prior art, which will not be repeated herein.

In the case of SA, different core network elements can support different SNPNs. A NID corresponding to a core network element is sent to the first BS through a NG setup response message, or updated NID information corresponding to the core network element is sent to the first BS through a configuration update signaling of the core network element. The configuration update signaling of the core network element is, for example, AMF CONFIGURATION UPDATE, and the NG setup response message is, for example, NG SETUP REQUEST. These messages may comprise a NID list corresponding to the core network element.

In some embodiments, the first BS matches the NID and the PLMN ID, which correspond to the SNPN that the terminal applies to access with a NID and a PLMN ID, which correspond to a SNPN to which the terminal is connected under the first BS; if matched, the first BS compares the NID and the PLMN ID, which correspond to the SNPN to which the terminal is connected under the first BS with a NID and a PLMN ID, which correspond to each core network element, and determine a core network element with a same NID and a same PLMN ID as the NID and the PLMN ID, which correspond to the SNPN to which the terminal is connected under the first BS, and sends the handover required message to the core network element. The first BS verifies the NID of the SNPN that the terminal applies to access to ensure that the SNPN that the terminal applies to access is consistent with a SNPN currently accessed. Then, an appropriate core network element is selected, to which the handover required message is sent.

In step S306, the core network element sends a handover request to the second BS according to the handover required message.

In some embodiments, the core network element determines whether a current handover of the terminal is legal according to a comparison result between the NID and the PLMN ID, which correspond to the SNPN that the terminal applies to access and NIDs and PLMN IDs, which correspond to one or more SNPNs subscribed by the terminal; and sends the handover request to the second BS, in a case where the current handover of the terminal is legal. If the NID and the PLMN ID, which correspond to the SNPN that the terminal applies to access are identical to the NID and the PLMN ID, which correspond to a SNPN subscribed by the terminal, it is determined that the current handover of the terminal is legal. The core network controls the handover of the terminal through the authentication of the terminal.

In some embodiments, a BS sends NIDs corresponding to one or more SNPNs supported by the BS to a core network element through a NG setup request (for example, NG SETUP REQUEST); the core network element may return a NG setup response (NG SETUP RESPONSE) to the BS. Alternatively, the BS sends the NIDs corresponding to the one or more SNPNs supported by the BS to the core network element through a RAN configuration update message (for example, RAN CONFIGURATION UPDATE). The core network element may return a RAN configuration update confirmation message (for example, RAN CONFIGURATION UPDATE) to the BS. The BS sends the NIDs corresponding to the one or more SNPNs supported by itself to the core network, so that the core network can control the handover of the terminal. The BS may also send NIDs corresponding to SNPNs supported by respective cells to the core network element through the above method.

In some embodiments, the core network element matches the NIDs and the PLMN IDs, which correspond to the one or more SNPNs subscribed by the terminal with NIDs and PLMN IDs, which correspond to one or more SNPNs supported by the second BS, and sends the handover request to the second BS by the core network element, in a case where the match is successful. Alternatively, the core network element matches the NID and the PLMN ID, which correspond to the SNPN that the terminal applies to access with a NID and a PLMN ID, which correspond to a SNPN supported by the target cell, and sends the handover request to the second BS by the core network element, in a case where the match is successful.

The handover request is, for example, Handover Request, in which the NID corresponding to the SNPN that the terminal applies to access can be added. The NID corresponding to the SNPN that the terminal applies to access can be added to the Mobility Restriction List. In the current SA scenario, a cross-SNPN handover of the terminal is not supported. That is, the NID corresponding to the SNPN that the terminal applies to access must be the same as the NID corresponding to the SNPN that the terminal is currently connected to. The NID corresponding to the SNPN that the terminal applies to access is the Serving NID.

In step S308, the second BS sends a handover request acknowledge message to the core network element, and correspondingly, the core network element receives the handover request acknowledge message sent from the second BS.

In some embodiments, the second BS determines whether to allow a handover of the terminal according to the NID and the PLMN ID, which correspond to the SNPN that the terminal applies to access, and NIDs and PLMN IDs, which correspond to one or more SNPNs supported by the second BS, and sends a handover request acknowledge message to the core network element, in a case of allowing the handover of the terminal. In a case that the NIDs and the PLMN IDs of the one or more SNPNs supported by the second BS have an intersection with the NID and the PLMN ID, which correspond to the SNPN that the terminal applies to access, it is determined that the handover of the terminal is allowed. Alternatively, the second BS determines whether to allow a handover of the terminal according to the NID and the PLMN ID, which correspond to the SNPN that the terminal applies to access and a NID and a PLMN ID, which correspond to a SNPN supported by the target cell, and sends a handover request acknowledge message to the core network element, in a case of allowing the handover of the terminal. The second BS can control the handover of the terminal through the authentication of the terminal.

In step S310, the core network element returns a handover command to the first BS according to the handover request acknowledge message; correspondingly, the first BS receives the handover command returned by the core network element according to the handover request acknowledge message, so as to hand over the terminal to the SNPN supported by the second BS.

The handover command is, for example, a Handover Command, and a reference can be made to the prior art for the subsequent handover process.

In the above NG-based handover embodiment, the source BS (the first BS) sends a handover required message to the core network, and the core network can control the selection of the target BS (second BS) or the target cell according to the measurement report of the terminal. The target BS can determine whether to allow the access through the authentication of the terminal. By adding the NID corresponding to the SNPN that the terminal applies to access in the existing handover signaling, the process of terminal handover between SNPNs of different BSs can be achieved.

The present disclosure also provides a BS, which will be described below with reference to FIG. 4.

Figure 4:
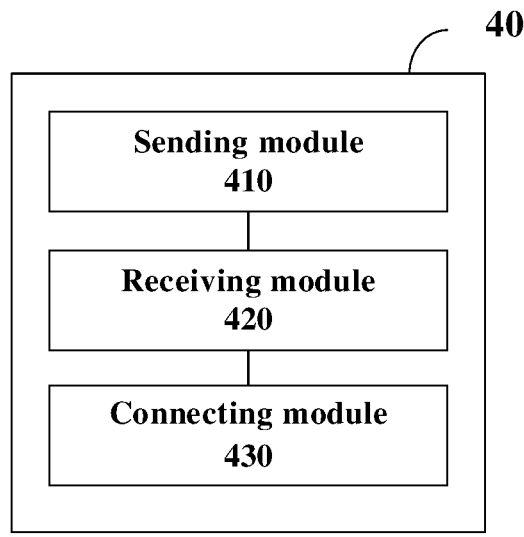
FIG. 4 shows a schematic structural diagram of a BS according to some embodiments of the present disclosure.

FIG. 4 is a structural diagram of a BS according to some embodiments of the present disclosure. As shown in FIG. 4, the BS 40 of this embodiment comprises a sending module 410, a receiving module 420 and a connecting module 430. The BS 40 is used as the first BS in the foregoing embodiment.

The sending module 410 is configured to send a broadcast message, which comprises: a Network Identifier (NID) and a Public Land Mobile Network Identifier (PLMN ID), which correspond to each of one or more Standalone Non-Public Networks (SNPNs) supported by the first BS.

The receiving module 420 is configured to receive a connection request sent from a terminal, wherein the connection request represents that the first BS supports at least one of one or more SNPNs subscribed by the terminal.

In one or more embodiments, the terminal determines whether the first BS supports at least one of the one or more SNPNs subscribed by the terminal according to a comparison result between the NIDs and the PLMN IDs, which correspond to the one or more SNPNs subscribed by the terminal and the NID and the PLMN ID, which correspond to the each of the one or more SNPNs supported by the first BS.

The connecting module 430 is configured to establish a Radio Resource Control (RRC) connection with the terminal according to the connection request, receive a RRC connection setup complete message sent from the terminal, and connect the terminal to a SNPN that the terminal selects to access, according to the RRC connection setup complete message, wherein the RRC connection setup complete message carries a NID and a PLMN ID, which correspond to the SNPN that the terminal selects to access.

In some embodiments, the sending module 410 is further configured to send an initial user equipment (UE) message to a core network element, wherein the initial UE message comprises the NID and the PLMN ID, which correspond to the SNPN that the terminal selects to access, which are used for verifying whether a current access of the terminal is legal; The receiving module 420 is further configured to receive a downlink non-access stratum transport message sent from the core network element, and connecting the terminal to the SNPN that the terminal selects to access according to the downlink non-access stratum transport message, wherein the downlink non-access stratum transport message represents that the current access of the terminal is legal.

In some embodiments, whether the current access of the terminal is legal is determined according to a comparison result between the NID and the PLMN ID, which correspond the SNPN that the terminal selects to access and NIDs and PLMN IDs, which correspond to the one or more SNPNs subscribed by the terminal.

In some embodiments, the receiving module 420 is further configured to receive a measurement report sent from the terminal, wherein the measurement report comprises: a NID, a PLMN ID and signal quality information of a cell, which correspond to a SNPN that the terminal applies to access. The sending module 410 is configured to make a handover judgment and determining a cell corresponding to a second BS as a target cell according to the measurement report by the first BS; and send a handover required message to a core network element, to initiate a handover request to the second BS through the core network element, wherein the handover required message comprises the NID and the PLMN ID, which correspond the SNPN that the terminal applies to access, and an identifier of the target cell, in a case where the first BS judges that a handover condition is met. The receiving module 420 is further configured to receive a handover command returned by the core network element, and executing a handover process, wherein the handover command represents that the target cell supports the SNPN that the terminal applies to access.

In some embodiments, the sending module 410 is further configured to match the NID and the PLMN ID, which correspond the SNPN that the terminal applies to access with a NID and a PLMN ID, which correspond to a SNPN to which the terminal is connected under the first BS; if matched, compare the NID and the PLMN ID, which correspond to the SNPN to which the terminal is connected under the first BS with a NID and a PLMN ID, which correspond to each core network element, and determine a core network element with a same NID and a same PLMN ID as the NID and the PLMN ID, which correspond to the SNPN to which the terminal is connected under the first BS, and send the handover required message to the core network element.

In some embodiments, the receiving module 420 is further configured to receive a configuration update signaling or a NG setup response message of each core network element, wherein the configuration update signaling comprises information of an updated NID corresponding to the each core network element, or the NG setup response message comprises a NID corresponding to the each core network element.

In some embodiments, the core network element determines whether a current handover of the terminal is legal according to a comparison result between the NID and the PLMN ID, which correspond to the SNPN that the terminal applies to access and NIDs and PLMN IDs, which correspond to one or more SNPNs subscribed by the terminal and send the handover request to the second BS, in a case where the current handover of the terminal is legal.

In some embodiments, the core network element matches the NIDs and the PLMN IDs, which correspond to the one or more SNPNs subscribed by the terminal with NIDs and PLMN IDs, which correspond to one or more SNPNs supported by the second BS, and sends the handover request to the second BS by the core network element, in a case where the match is successful. Or the core network element matches the NID and the PLMN ID, which correspond to the SNPN that the terminal applies to access with a NID and a PLMN ID, which correspond to a SNPN supported by the target cell, and sends the handover request to the second BS by the core network element, in a case where the match is successful.

In some embodiments, the second BS sends the NIDs corresponding to one or more SNPNs supported by the second BS to the core network element through a NG setup request; or the second BS sends the NIDs corresponding to one or more SNPNs supported by the second BS to the core network element through a RAN configuration update message.

In some embodiments, the handover request comprises a mobility restriction list, which comprises the NID and the PLMN ID, which correspond to the SNPN that the terminal applies to access; the second BS determines whether to allow a handover of the terminal according to a comparison result between the NID and the PLMN ID, which correspond to the SNPN that the terminal applies to access, and NIDs and PLMN IDs, which correspond to one or more SNPNs supported by the second BS, or a comparison result between the NID and the PLMN ID, which correspond to the SNPN that the terminal applies to access and a NID and a PLMN ID, which correspond to a SNPN supported by the target cell; and sends a handover request acknowledge message to the core network element, in a case of allowing the handover of the terminal. The core network element sends a handover command to the first BS according to the handover request acknowledge message.

The present disclosure also provides a terminal, which will be described below with reference to FIG. 5.

Figure 5:
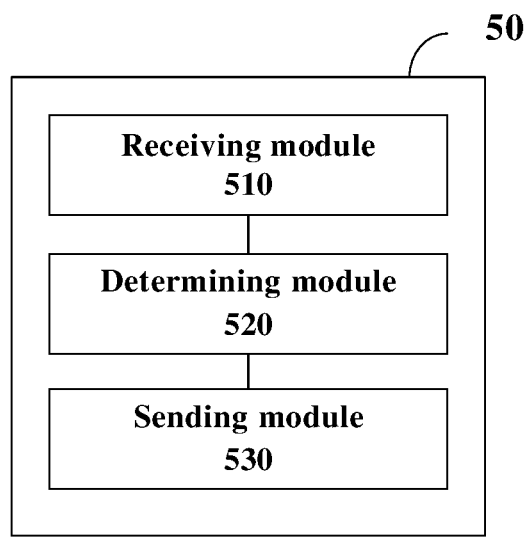
FIG. 5 shows a schematic structural diagram of a terminal according to some embodiments of the present disclosure.

FIG. 5 is a structural diagram of a terminal according to some embodiments of the present disclosure. As shown in FIG. 5, the terminal 50 of this embodiment comprises: a receiving module 510, a determining module 520, and a sending module 530.

The receiving module 510 is configured to receive a broadcast message sent from a first Base Station (BS), wherein the broadcast message comprising: a Network Identifier (NID) and a Public Land Mobile Network Identifier (PLMN ID), which correspond to each of one or more Standalone Non-Public Networks (SNPNs) supported by the first BS.

The determining module 520 is configured to determine whether the first BS supports at least one of one or more SNPNs subscribed by the terminal according to the broadcast message.

In some embodiments, the determining module 520 is configured to determine whether the first BS supports at least one of the one or more SNPNs subscribed by the terminal according to a comparison result between the NIDs and the PLMN IDs, which correspond to the one or more SNPNs subscribed by the terminal and the NID and the PLMN ID, which correspond to the each of the one or more SNPNs supported by the first BS.

The sending module 530 is configured to, if the first BS supports at least one of the one or more SNPNs subscribed by the terminal, select by the terminal, an SNPN from the at least one of the one or more SNPNs subscribed by the terminal and supported by the first BS, send a connection request to the first BS, and establish a Radio Resource Control (RRC) connection with the first BS, and send a RRC connection setup complete message to the first BS, wherein the RRC connection setup complete message carries a NID and a PLMN ID, which correspond to the SNPN that the terminal selects, to instruct the first BS to connect the terminal to the SNPN selected.

In some embodiments, the sending module 530 is further configured to send a measurement report to the first BS, wherein the measurement report comprises: a NID, a PLMN ID and signal quality information of a cell, which correspond to a SNPN that the terminal applies to access, to instruct the first BS to handover the terminal to the SNPN that the terminal applies to access.

The present disclosure further provides a communication system, which will be described below with reference to FIG. 6.

Figure 6:
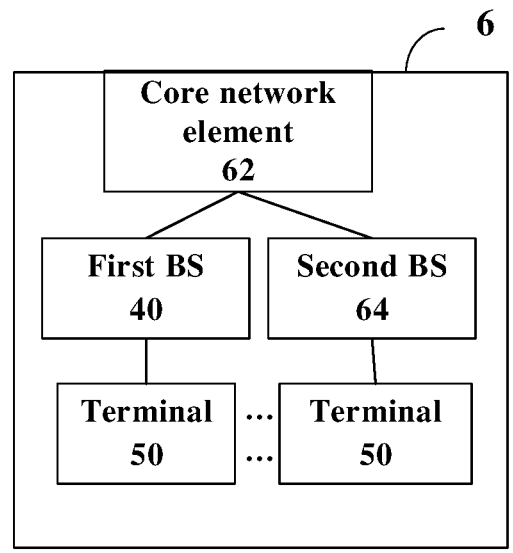
FIG. 6 shows a structural diagram of a communication system according to some embodiments of the present disclosure.

FIG. 6 is a structural diagram of a communication system according to some embodiments of the present disclosure. As shown in FIG. 6, the system 6 of this embodiment comprises: a BS 40 according to any of the foregoing embodiments and a terminal 50 according to any of the foregoing embodiments. The BS 40 is used as the first BS.

In some embodiments, the system 6 further comprises: a core network element 62 configured to receive an initial user equipment (UE) message sent from the first BS 40, determine whether a current access of the terminal 50 is legal according to the initial UE message, and send a downlink non-access stratum transport message to the first BS 40, in a case where the current access of the terminal 50 is legal, wherein the initial UE message comprises the NID and the PLMN ID, which correspond to the SNPN that the terminal 50 selects to access.

In some embodiments, the core network element 62 is configured to determine whether the current access of the terminal 50 is legal according to a comparison result between the NID and the PLMN ID, which correspond to the SNPN that the terminal 50 selects to access and NIDs and PLMN IDs, which correspond to the one or more SNPNs subscribed by the terminal 50.

In some embodiments, the system 60 further comprises: a second BS 64; the core network element 62 is further configured to receive a handover required message sent from the first BS 40, send a handover request to the second BS 64 according to the handover required message, receive a handover request acknowledge message sent from the second BS 64, and return a handover command to the first BS 40, wherein the handover required message comprises the NID and the PLMN ID, which correspond to the SNPN that the terminal 50 applies to access, and an identifier of a target cell; and the second BS 64 is configured to receive the handover request sent from the core network element 62, if the target cell supports the SNPN that the terminal 50 applies to access, send the handover request acknowledge message to the core network element 62.

In some embodiments, the core network element 62 is further configured to determine whether a current handover of the terminal 50 is legal according to a comparison result between the NID and the PLMN ID, which correspond to the SNPN that the terminal 50 applies to access and NIDs and PLMN IDs, which correspond to the SNPNs subscribed by the terminal 50, and send the handover request to the second BS 64, in a case where the current handover of the terminal 50 is legal.

In one embodiment, the core network element 62 is further configured to match the NIDs and the PLMN IDs, which correspond to the one or more SNPNs subscribed by the terminal 50 with NIDs and PLMN IDs, which correspond to one or more SNPNs supported by the second BS 64, and send the handover request to the second BS 64, in a case where the match is successful; or the core network element 62 is further configured to match the NID and the PLMN ID, which correspond to the SNPN that the terminal 50 applies to access with a NID and a PLMN ID, which correspond to a SNPN supported by the target cell, and send the handover request to the second BS 64, in a case where the match is successful.

In some embodiments, the second BS 64 is configured to send the NIDs corresponding to the one or more SNPNs supported by the second BS 64 to the core network element 62 through a Next Generation (NG) setup request or a Radio Access Network (RAN) configuration update message.

In some embodiments, the second BS 64 is further configured to determine whether to allow a handover of the terminal 50 according to the NID and the PLMN ID, which correspond to the SNPN that the terminal 50 applies to access, and NIDs and PLMN IDs, which correspond to one or more SNPNs supported by the second BS 64, and send a handover request acknowledge message to the core network element 62, in a case of allowing the handover of the terminal 50; or the second BS 64 is further configured to determine whether to allow a handover of the terminal 50 according to the NID and the PLMN ID, which correspond to the SNPN that the terminal 50 applies to access and a NID and a PLMN ID, which correspond to a SNPN supported by the target cell, and send a handover request acknowledge message to the core network element 62 in a case of allowing the handover of the terminal 50.

In some embodiments, the core network element 62 is configured to send a NID corresponding to the core network element to the first BS through core network element configuration update signaling or a NG setup response message.

The communication system of this embodiment of the present disclosure, as well as the BS and terminal, may be implemented by various computing devices or computer systems, which will be described below with reference to FIGS. 7 and 8.

Figure 7:
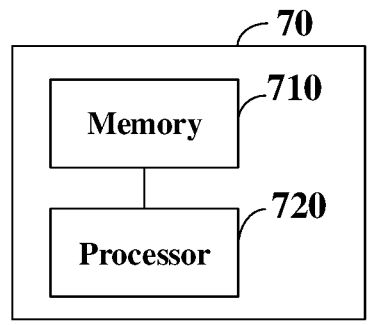
FIG. 7 shows a structural diagram of a communication system according to other embodiments of the present disclosure.

FIG. 7 is a structural diagram of a communication system according to some embodiments of the present disclosure. As shown in FIG. 7, the communication system 70 of this embodiment comprises: a memory 710 and a processor 720 coupled to the memory 710, the processor 720 configured to, based on instructions stored in the memory 710, carry out the communication method according to any one of the embodiments of the present disclosure.

Wherein, the memory 710 may comprise, for example, system memory, a fixed non-volatile storage medium, or the like. The system memory stores, for example, an operating system, applications, a boot loader, a database, and other programs.

Figure 8:
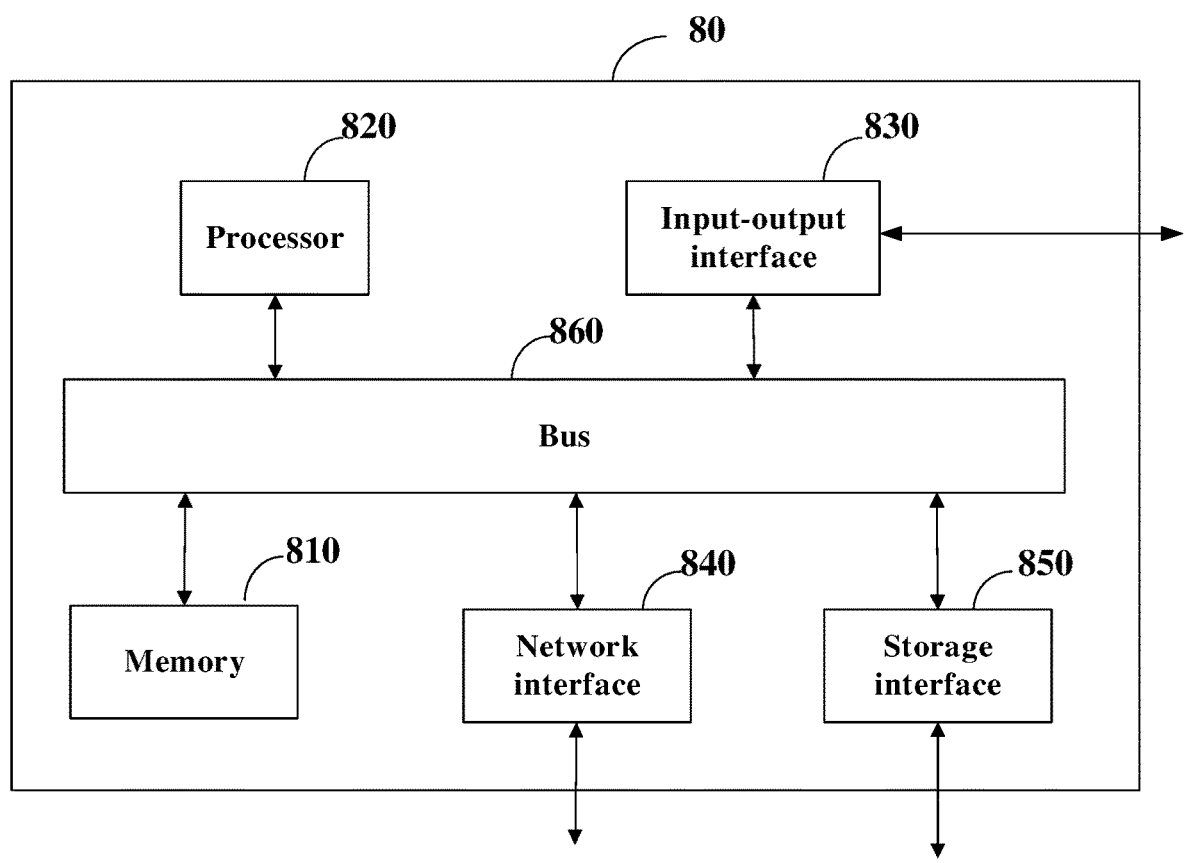
FIG. 8 shows a structural diagram of a communication system according to still other embodiments of the present disclosure.

FIG. 8 is a structural diagram of a communication system according to other embodiments of the present disclosure. As shown in FIG. 8, the communication system 80 of this embodiment comprises: a memory 810 and a processor 820 that are similar to the memory 710 and the processor 720, respectively. It may also comprise an input-output interface 830, a network interface 840, a storage interface 850, and the like. These interfaces 830, 840, 850 and the memory 810 and the processor 820 may be connected to each other through a bus 860, for example. Wherein, the input-output interface 830 provides a connection interface for input-output devices such as a display, a mouse, a keyboard, and a touch screen. The network interface 840 provides a connection interface for various networked devices, for example, it can be connected to a database server or a cloud storage server. The storage interface 850 provides a connection interface for external storage devices such as an SD card and a USB flash disk.

The specific structures for implementing the BS and terminal by computing devices or computer systems are similar to that shown in FIGS. 7 and 8, which will not be repeated herein.

According to still other embodiments of the present disclosure, there is provided a non-transitory computer-readable storage medium storing computer programs, when executed by a processor, cause the processor to implement the communication method of any one of the foregoing embodiments.

According to still other embodiments of the present disclosure, there is provided a non-transitory computer-readable storing computer programs, when executed by a processor, cause the processor to implement the methods performed by the first BS and the second BS in the communication method of any one of the foregoing embodiments.

According to still other embodiments of the present disclosure, there is provided a non-transitory computer-readable storage medium storing computer programs, when executed by a processor, cause the processor to implement the method performed by the terminal in the communication method of any one of the foregoing embodiments.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing apparatus to operate in a specific manner such that the instructions stored in the computer readable memory device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A communication method, comprising:
    sending, by a first Base Station (BS), a broadcast message, which comprises: a Network Identifier (NID) and a Public Land Mobile Network Identifier (PLMN ID), which correspond to each of one or more Standalone Non-Public Networks (SNPNs) supported by the first BS;
    receiving, by the first BS, a connection request sent from a terminal, wherein the connection request represents that the first BS supports at least one of one or more SNPNs subscribed by the terminal;
    establishing, by the first BS, a Radio Resource Control (RRC) connection with the terminal according to the connection request;
    receiving, by the first BS, a RRC connection setup complete message sent from the terminal, wherein the RRC connection setup complete message carries a NID and a PLMN ID, which correspond to a SNPN that the terminal selects to access; and
    connecting, by the first BS, the terminal to the SNPN that the terminal selects to access, according to the RRC connection setup complete message;
    receiving, by the first BS, a measurement report sent from the terminal, wherein the measurement report comprises: a NID, a PLMN ID and signal quality information of a cell, which correspond to a SNPN that the terminal applies to access;
    making a handover judgment and determining a cell corresponding to a second BS as a target cell according to the measurement report by the first BS;
    sending, by the first BS, a handover required message to a core network element, to initiate a handover request to the second BS through the core network element, wherein the handover required message comprises the NID and the PLMN ID, which correspond the SNPN that the terminal applies to access, and an identifier of the target cell, in a case where the first BS judges that a handover condition is met; and
    receiving, by the first BS, a handover command returned by the core network element, and executing a handover process, wherein the handover command represents that the target cell supports the SNPN that the terminal applies to access.

2. The communication method according to claim 1, wherein connecting, by the first BS, the terminal to the SNPN that the terminal selects to access comprises:
    sending, by the first BS, an initial user equipment (UE) message to a core network element, wherein the initial UE message comprises the NID and the PLMN ID, which correspond to the SNPN that the terminal selects to access, which are used for verifying whether a current access of the terminal is legal; and
    receiving, by the first BS, a downlink non-access stratum transport message sent from the core network element, and connecting the terminal to the SNPN that the terminal selects to access according to the downlink non-access stratum transport message, wherein the downlink non-access stratum transport message represents that the current access of the terminal is legal.

3. The communication method according to claim 2, wherein:
the NID corresponding to the SNPN that the terminal selects to access is added to a mobility restriction list of the downlink non-access stratum transport message as a serving NID; or
whether the current access of the terminal is legal is determined according to a comparison result between the NID and the PLMN ID, which correspond the SNPN that the terminal selects to access and NIDs and PLMN IDs, which correspond to the one or more SNPNs subscribed by the terminal.

4. The communication method according to claim 1, wherein sending, by the first BS, the handover required message to the core network element, to initiate the handover request to the second BS through the core network element comprises:
matching, by the first BS, the NID and the PLMN ID, which correspond the SNPN that the terminal applies to access with a NID and a PLMN ID, which correspond to a SNPN to which the terminal is connected under the first BS;
if matched, comparing, by the first BS, the NID and the PLMN ID, which correspond to the SNPN to which the terminal is connected under the first BS with a NID and a PLMN ID, which correspond to each core network element, and determining a core network element with a same NID and a same PLMN ID as the NID and the PLMN ID, which correspond to the SNPN to which the terminal is connected under the first BS, and sending the handover required message to the core network element;
optionally, the method further comprising: receiving, by the first BS, a configuration update signaling or a Next Generation (NG) setup response message of each core network element, wherein the configuration update signaling comprises information of an updated NID corresponding to the each core network element, or the NG setup response message comprises a NID corresponding to the each core network element.

5. The communication method according to claim 1, further comprising: after the first BS sends the handover required message to the core network element,
determining, by the core network element, whether a current handover of the terminal is legal according to a comparison result between the NID and the PLMN ID, which correspond to the SNPN that the terminal applies to access and NIDs and PLMN IDs, which correspond to one or more SNPNs subscribed by the terminal; and
sending, by the core network element, the handover request to the second BS, in a case where the current handover of the terminal is legal.

6. The communication method according to claim 5, wherein sending, by the core network element, the handover request to the second BS comprises:
matching the NIDs and the PLMN IDs, which correspond to the one or more SNPNs subscribed by the terminal with NIDs and PLMN IDs, which correspond to one or more SNPNs supported by the second BS, and sending the handover request to the second BS by the core network element, in a case where the match is successful; or
matching the NID and the PLMN ID, which correspond to the SNPN that the terminal applies to access with a NID and a PLMN ID, which correspond to a SNPN supported by the target cell, and sending the handover request to the second BS by the core network element, in a case where the match is successful;
optionally, wherein the second BS sends the NIDs corresponding to the one or more SNPNs supported by the second BS to the core network element through a Next Generation (NG) setup request or a Radio Access Network (RAN) configuration update message.

7. The communication method according to claim 1, wherein the handover request comprises a mobility restriction list, which comprises the NID and the PLMN ID, which correspond to the SNPN that the terminal applies to access, and the method further comprises:
determining, by the second BS, whether to allow a handover of the terminal according to a comparison result between the NID and the PLMN ID, which correspond to the SNPN that the terminal applies to access, and NIDs and PLMN IDs, which correspond to one or more SNPNs supported by the second BS, or a comparison result between the NID and the PLMN ID, which correspond to the SNPN that the terminal applies to access and a NID and a PLMN ID, which correspond to a SNPN supported by the target cell;
sending, by the second BS, a handover request acknowledge message to the core network element, in a case of allowing the handover of the terminal; and
sending, by the core network element, a handover command to the first BS according to the handover request acknowledge message.

8. A communication method, comprising:
receiving, by a terminal, a broadcast message sent from a first Base Station (BS), wherein the broadcast message comprising: a Network Identifier (NID) and a Public Land Mobile Network Identifier (PLMN ID), which correspond to each of one or more Standalone Non-Public Networks (SNPNs) supported by the first BS;
determining, by the terminal, whether the first BS supports at least one of one or more SNPNs subscribed by the terminal according to the broadcast message, comprising: determining, by the terminal, whether the first BS supports at least one of the one or more SNPNs subscribed by the terminal according to a comparison result between the NIDs and the PLMN IDs, which correspond to the one or more SNPNs subscribed by the terminal and the NID and the PLMN ID, which correspond to the each of the one or more SNPNs supported by the first BS;
if the first BS supports at least one of the one or more SNPNs subscribed by the terminal, selecting, by the terminal, an SNPN from the at least one of the one or more SNPNs subscribed by the terminal and supported by the first BS;
sending, by the terminal, a connection request to the first BS, and establishing a Radio Resource Control (RRC) connection with the first BS; and
sending, by the terminal, a RRC connection setup complete message to the first BS, wherein the RRC connection setup complete message carries a NID and a PLMN ID, which correspond to the SNPN that the terminal selects, to instruct the first BS to connect the terminal to the SNPN selected.

9. A communication method, comprising:
receiving, by a terminal, a broadcast message sent from a first Base Station (BS), wherein the broadcast message comprising: a Network Identifier (NID) and a Public Land Mobile Network Identifier (PLMN ID), which correspond to each of one or more Standalone Non-Public Networks (SNPNs) supported by the first BS;

determining, by the terminal, whether the first BS supports at least one of one or more SNPNs subscribed by the terminal according to the broadcast message;

if the first BS supports at least one of the one or more SNPNs subscribed by the terminal, selecting, by the terminal, an SNPN from the at least one of the one or more SNPNs subscribed by the terminal and supported by the first BS;

sending, by the terminal, a connection request to the first BS, and establishing a Radio Resource Control (RRC) connection with the first BS;

sending, by the terminal, a RRC connection setup complete message to the first BS, wherein the RRC connection setup complete message carries a NID and a PLMN ID, which correspond to the SNPN that the terminal selects, to instruct the first BS to connect the terminal to the SNPN selected; and sending, by the terminal, a measurement report to the first BS, wherein the measurement report comprises: a NID, a PLMN ID and signal quality information of a cell, which correspond to a SNPN that the terminal applies to access, to instruct the first BS to handover the terminal to the SNPN that the terminal applies to access.

10. A base station (BS), comprising:
a processor; and
a memory coupled to the processor and storing instructions that when executed by the processor, cause the processor to execute the communication method according to claim 1.

11. A terminal, comprising:
a processor; and
a memory coupled to the processor and storing instructions that when executed by the processor, cause the processor to execute the communication method according to claim 8.

12. A terminal, comprising:
a processor; and
a memory coupled to the processor and storing instructions that when executed by the processor, cause the processor to execute the communication method according to claim 9.

13. A communication system, comprising: a Base Station (BS) according to claim 10, and a terminal, wherein the terminal comprises:
a processor; and
a memory coupled to the processor and storing instructions that when executed by the processor, cause the processor to:

receive a broadcast message sent from a first Base Station (BS), wherein the broadcast message comprising: a Network Identifier (NID) and a Public Land Mobile Network Identifier (PLMN ID), which correspond to each of one or more Standalone Non-Public Networks (SNPNs) supported by the first BS;

determine whether the first BS supports at least one of one or more SNPNs subscribed by the terminal according to the broadcast message;

if the first BS supports at least one of the one or more SNPNs subscribed by the terminal, select an SNPN from the at least one of the one or more SNPNs subscribed by the terminal and supported by the first BS;

send a connection request to the first BS, and establishing a Radio Resource Control (RRC) connection with the first BS;

send a RRC connection setup complete message to the first BS, wherein the RRC connection setup complete message carries a NID and a PLMN ID, which correspond to the SNPN that the terminal selects, to instruct the first BS to connect the terminal to the SNPN selected; and send a measurement report to the first BS, wherein the measurement report comprises: a NID, a PLMN ID and signal quality information of a cell, which correspond to a SNPN that the terminal applies to access, to instruct the first BS to handover the terminal to the SNPN that the terminal applies to access.

14. The communication system according to claim 13, further comprising:
a core network element configured to receive an initial user equipment (UE) message sent from the first BS, determine whether a current access of the terminal is legal according to the initial UE message, and send a downlink non-access stratum transport message to the first BS, in a case where the current access of the terminal is legal, wherein the initial UE message comprises the NID and the PLMN ID, which correspond to the SNPN that the terminal selects to access.

15. The communication system according to claim 13, further comprising: a second BS, wherein the core network element is further configured to receive a handover required message sent from the first BS, send a handover request to the second BS according to the handover required message, receive a handover request acknowledge message sent from the second BS, and return a handover command to the first BS, wherein the handover required message comprises the NID and the PLMN ID, which correspond to the SNPN that the terminal applies to access, and an identifier of a target cell; and the second BS is configured to receive the handover request sent from the core network element, if the target cell supports the SNPN that the terminal applies to access, send the handover request acknowledge message to the core network element.

16. The communication system according to claim 14, wherein:
the core network element is configured to determine whether the current access of the terminal is legal according to a comparison result between the NID and the PLMN ID, which correspond to the SNPN that the terminal selects to access and NIDs and PLMN IDs, which correspond to the one or more SNPNs subscribed by the terminal; or the core network element is configured to send information of an updated NID corresponding to the core network element to the first BS through a core network element configuration update signaling, or send a NID corresponding to the core network element to the first BS through a Next Generation (NG) setup response message.

17. The communication system according to claim 14, wherein:
the core network element is further configured to determine whether a current handover of the terminal is legal according to a comparison result between the NID and the PLMN ID, which correspond to the SNPN that the terminal applies to access and NIDs and PLMN IDs, which correspond to the SNPNs subscribed by the terminal, and send the handover request to the second BS, in a case where the current handover of the terminal is legal; or the second BS is further configured to determine whether to allow a handover of the terminal according to a comparison result between the NID and the PLMN ID, which correspond to the SNPN that the terminal applies to access, and NIDs and PLMN IDs, which correspond to one or more SNPNs supported by the second BS, or a comparison result between the NID and the PLMN ID, which correspond to the SNPN that the terminal applies to access and a NID and a PLMN ID, which correspond to a SNPN supported by the target cell, and send a handover request acknowledge message to the core network element, in a case of allowing the handover of the terminal.

18. The communication system according to claim 17, wherein:

the core network element is further configured to match the NIDs and the PLMN IDs, which correspond to the one or more SNPNs subscribed by the terminal with NIDs and PLMN IDs, which correspond to one or more SNPNs supported by the second BS, and send the handover request to the second BS, in a case where the match is successful; or the core network element is further configured to match the NID and the PLMN ID, which correspond to the SNPN that the terminal applies to access with a NID and a PLMN ID, which correspond to a SNPN supported by the target cell, and send the handover request to the second BS, in a case where the match is successful.

19. The communication system according to claim 17, wherein the second BS is configured to send the NIDs corresponding to the one or more SNPNs supported by the second BS to the core network element through a Next Generation (NG) setup request or a Radio Access Network (RAN) configuration update message.

* * * * *